Nov. 11, 1958 C. W. DICKEY 2,859,610
APPARATUS FOR TESTING FRANGIBLE ARTICLES
Filed Dec. 16, 1954 2 Sheets-Sheet 1

INVENTOR.
CLYDE W. DICKEY
BY Clarence R. Patty, Jr.
ATTORNEY

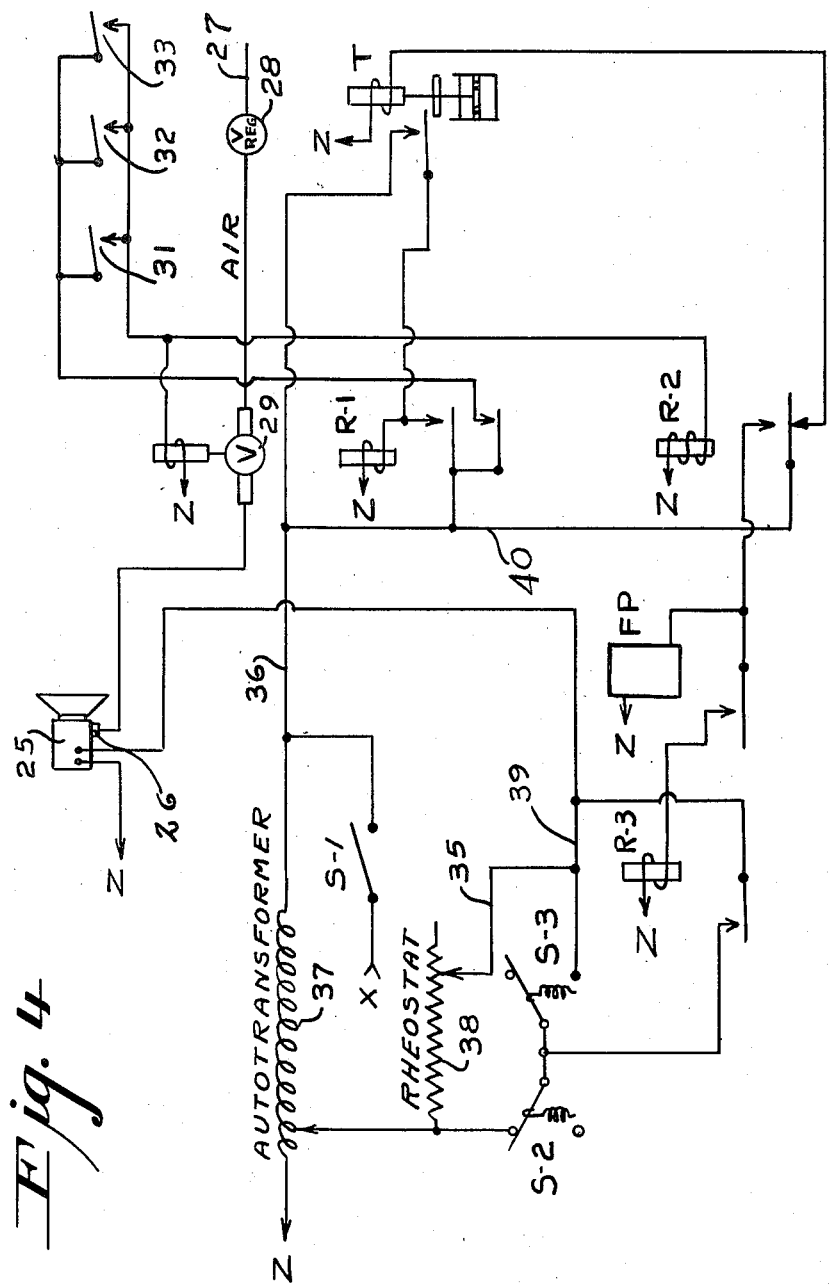

_United States Patent Office_ 2,859,610
Patented Nov. 11, 1958

2,859,610

APPARATUS FOR TESTING FRANGIBLE ARTICLES

Clyde W. Dickey, Elmira, N. Y., assignor to Corning Glass Works, Corning, N. Y., a corporation of New York Application December 16, 1954, Serial No. 475,620

7 Claims. (Cl. 73—69)

The present invention is concerned with the elimination of defective frangible articles from the good articles of a group by selectively destroying those defective and/or with the removal from the articles of the group any particles of foreign matter that may have become attached thereto.

Glassware of a wide range of sizes and types of bulbous articles, such for example as incandescent lamp bulb envelopes, is mass produced by blowing machines at rates up to and sometimes materially exceeding a million in twenty-four hours. Normally the articles produced are immediately annealed and the good ware, as determined by manual visual inspection of sample lots thereof, individually packed for shipment to lamp manufacturers. During certain periods of operation when the percentage of defective ware produced is quite great, as during upsets in the glass quality or faulty machine operation, it has proved more economical to discard all ware than to manually select the good ware from the lot. This practice obviously often entails a large loss of good ware.

Moreover, experiments have shown that such articles, if substantially all good, can be loose packed in large cartons for shipment to lamp manufacturers without material breakage during shipment and/or handling. However, visual inspection at a rate to eliminate substantially all of the defective articles is economically impracticable and the breakage of undetected defective articles, when the so inspected articles are loose packed, frees those remaining for movement about in the package, so that further breakage of good articles results. Moreover, the good articles remaining are often internally contaminated by particles of those broken, so that loose-packing has had to be abandoned in favor of the more expensive method of individually packing such articles.

According to the present invention, the good articles are selected by subjecting groups of a production run thereof to vibrations and sound over a wide range of values outside those at which the good articles are destroyed, to destroy only the defective articles of the group.

To establish the appropriate sound level and frequency range for the process, articles of a specific size and shape, manually inspected with extreme care and therefore known to be free from defects, are successively subjected to different frequencies of vibration and to different sound levels until the frequency and sound level ranges at which such articles are destroyed are established. By a similar procedure the sound level and frequency range at which the defective articles break is established.

By way of example, it has been found that good electric light bulb envelopes of the conventional 100-watt size can be consistently broken in a very narrow frequency range near 4.4 kc. and at sound levels between ¼ and 1 watt/cm.$^2$. Defective envelopes, on the other hand, break over a frequency range extending from 2 to 10 kc. and at a lower average sound level.

With the foregoing facts available facilities are provided in accordance with the invention to pass the ware through a sound chamber and to subject the ware therein to a frequency and sound level range that effectively destroys the defective ware only.

By such a method, irrespective of the ratio of good ware to bad produced, salvage of the good ware becomes economically feasible even when the percentage of good to defective ware is small. Moreover, such method of selection removes substantially all of the defective ware and, accordingly, the good ware remaining can be loose packed and shipped without the likelihood of excessive breakage occurring in shipment. Also, substantially no defective bulbs reach the fabricating equipment of the lamp manufacturer, thereby further reducing loss or shrinkage of ware in its latter stage of fabrication, thus further reducing the cost of the end product.

Moreover, such method, when applied to lamp bulb envelopes arranged in an inverted position, very effectively dislodges any foreign matter that may be present therein, freeing it for issuance therefrom, thus reducing the likelihood of lamps being fabricated with foreign matter therein. Obviously, if desired, the invention may be used for the purpose of removal of foreign matter from articles whether or not article selection is carried out or contemplated.

For a better understanding of the invention reference is now made to the accompanying drawings in which:

Fig. 4 is a schematic diagram of the sound producing system associated with the sound chamber.

Figure 1:
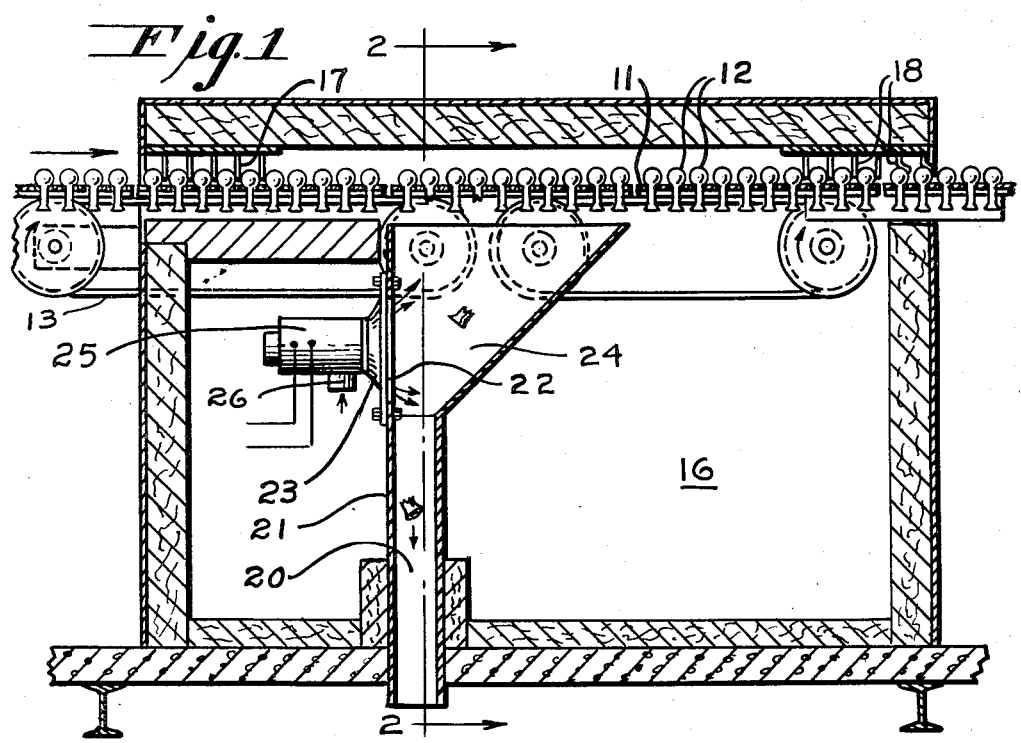
Fig. 1 is a side elevation of a conveyor having trays of bulbs thereon shown in section and being advanced through a siren equipped sound chamber also shown in section.
Figure 2:
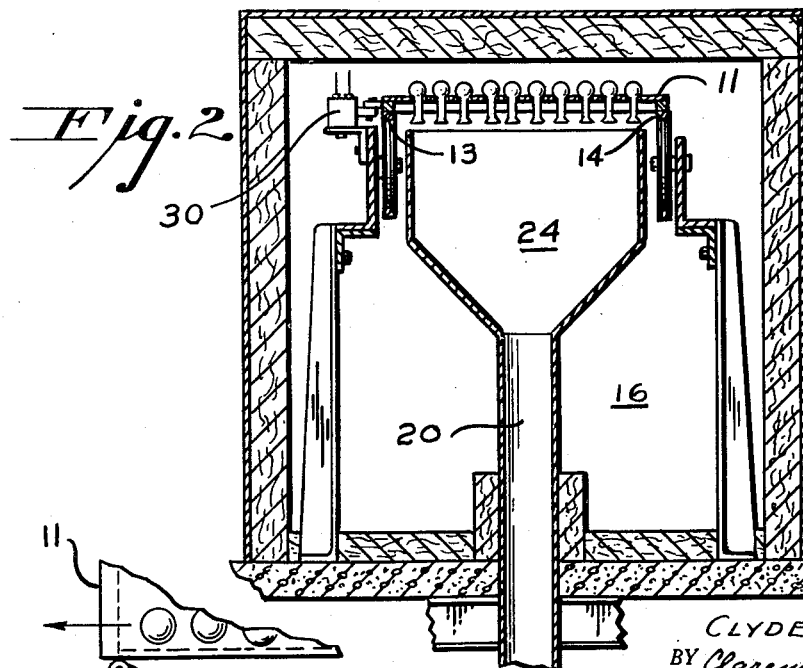
Fig. 2 is a sectional view taken on line 2—2 of Fig. 1.

Referring to the drawings in detail, trays such as 11 adapted to hold a band of one hundred bulbs or lamp envelopes such as 12, are arranged on a suitably driven conveyor, in the present instance a pair of belts 13 and 14, to advance such trays through the sound insulated chamber 16. Preferably groups of curtains such as 17 and 18 within the chamber 16 are arranged near the tray entrance and exit respectively in order to as fully as practicable confine within such chamber sounds produced therein. Well inward from the tray entrance end of the chamber 16 there is provided a cullet chute 20 the top open end of which is provided with a hopper 24 whose top end extends across a region under the path of travel of the bulb trays for receipt of broken bulb parts. The common wall 21 of chute 20 and hopper 24 has an opening 22 in its upper end closed by the open end of horn 23 of a high frequency siren 25. Obviously, the output of siren 25 is directed into hopper 24 so that the highest intensity of sound produced is directed towards bulbs as they are being advanced thereover during their passage through the chamber 16. Any suitable form of siren adapted to produce intense sound over a wide frequency range may be used; such for example as that disclosed in U. S. Patent No. 2,528,026.

A low speed operating circuit for siren 25, to be traced later, is closeable by a switch S1 (Fig. 4), which also closes a circuit for a timing relay T under whose control the supply of air to siren 25 is delayed until the siren has had time to attain speed. This arrangement is provided to prevent possible damage to the siren which should not have air supplied thereto unless it is operating.

Figure 3:
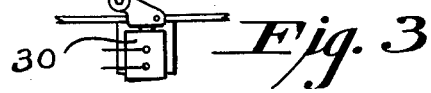
Fig. 3 is an enlarged view of a fragment of one of the trays shown in Figs. 1 and 2 in operative relation with one of a plurality of switches encountered and actuated by such trays during their passage through the sound chamber.

Air is supplied to an air intake tube 26 of siren 25 through a conduit 27 (Fig. 4) having included therein a suitable pressure regulating valve 28 and a magnetically operated normally closed control valve 29. The operating circuit of valve 29 includes contacts 31 of a tray operated switch such as 30 (Fig. 3) or contacts 32 or 33 of similar tray operated switches, not shown, and contacts of a relay R1 whose circuit is closeable by the timing relay T. The switches containing contacts 31, 32, and 33 are conveniently so arranged along the path of travel of the trays through the chamber 16 that one of them is actuated whenever any portion of a tray projects into or occupies such chamber.

A relay R2, operated in parallel with the magnet of valve 29, closes a circuit for a pulsing relay FP which is adapted to periodically effect the operation of a relay R3. Relay 3 in turn is adapted to periodically activate a high speed operating circuit for the siren 25 while trays of articles are occupying chamber 16. The relay FP may be of any suitable form, but conveniently comprises one made and sold commercially by Eagle Signal Corporation, Moline, Illinois, U. S. A. under the trade name "Flexo Pulse."

*Detailed operation*

As previously stated, upon the closure of switch S–1, operating circuits for the siren 25 and for the timing relay T are completed. Such circuits extend from an X terminal of a suitable current source, through switch S–1, to conductor 36, from which one branch extends through the autotransformer 37 and a rheostat 38 in series, conductors 35 and 39, and through the siren 25 to a Z terminal of the same current source; the other branch extends via conductors 36 and 40, through the back contacts of relay R2 and through the timing device T to another Z terminal of the same current source. Since the rheostat 38 is included in the traced circuit the siren 25 will initially operate at low speed.

At the expiration of a predetermined time interval timing relay T closes its contacts thereby completing the obvious circuit of relay R1. Relay R1, upon operating, at its inner contacts completes a locking circuit for itself via conductor 40 independently of the timing device contacts, and at its outer contacts closes one point in a common branch of the operating circuits of relay R2 and of the magnet of valve 29. Relay R2 upon operating opens its back contacts, thereby permitting the timing relay T to restore, and at its front contacts connects conductor 40 to the pulsing relay FP which, as previously stated, closes and then opens its contacts at pre-set time intervals to effect the periodic energization and deenergization of relay R3 so long as the circuit of FP remains closed. Each time relay R3 operates it places a shunt about the rheostat 38 via conductors 35, and 39, the contacts of relay R3 and a switch S–2. The siren 25 is accordingly alternately operated at low and high speeds to create sounds in chamber 16 over a frequency range in accordance with the adjusted positions of the rheostat 38 and the autotransformer 37 found most suitable to effect the breakage of faulty ware only, or alternatively those most suitable for dislodging foreign matter from the ware being treated.

The toggle switches S–2 and S–3 are merely provided for checking purposes. By deflecting switch S–2 continuous operation of the siren is effected enabling ready adjustment of the rheostat to attain a desired low speed. Similarly, by deflecting switch S–3 continuous high speed operation of the siren is effected enabling suitable adjustment of the autotransformer to attain the desired high speed.

What is claimed is:

1. In an article testing system, a sound chamber, a conveyor passing through said chamber, an article tray adapted to be supported by said conveyor for passage through said chamber, contacts adapted to be closed by a tray occupying said chamber, a siren within said chamber having low speed and high speed operating circuits, manually operable means for activating said low speed operating circuit, means under control of said contacts, for activating said high speed circuit, an air supply line to said siren including a magnetic valve, and an operating circuit for said valve including said contacts.

2. In an article testing system such as defined by claim 1 wherein the low speed operating circuit includes an autotransformer and a rheostat in series and the high speed operating circuit includes a shunt about said rheostat.

3. In an article testing system such as defined by claim 1 wherein said second defined means is adapted to operate intermittently while said contacts remain closed.

4. In a siren operating system such as defined by claim 1 which includes means for delaying the activation of said high speed operating circuit for a predetermined minimum time period following closure of the low speed circuit.

5. In a siren operating system, a siren having low and high speed operating circuits, means for introducing air into the siren, means for closing the low speed operating circuit, means for activating the high speed operating circuit only after the low speed operating circuit has been closed, and means for preventing the introduction of air into the siren until a predetermined time period has elapsed following closure of its low speed operating circuit.

6. In an article testing system, a sound chamber having inlet and outlet passages, means for conveying articles through said chamber via such passages, a siren for creating sound vibrations in said chamber, and means for operating said siren over a range of frequencies such as to vibrate defective articles at such intensity and at their natural frequency so that they will be broken, while avoiding the resonant frequency of sound ones of the articles being conveyed through said chamber.

7. In an article testing system, a sound insulated chamber for the confinement of a group of articles to be tested, sound generating means associated with said chamber for creating sound vibrations therein, and means for operating said sound generating means over a range of frequencies such as to vibrate defective articles at such intensity and at their natural frequency so that they will be broken, while avoiding the resonant frequency of sound articles of the group.

References Cited in the file of this patent

UNITED STATES PATENTS

| | | |
|---|---|---|
| 1,990,085 | Mudge et al. | Feb. 5, 1935 |
| 2,352,880 | Andalikiewicz | July 4, 1944 |
| 2,361,396 | Gross | Oct. 31, 1944 |
| 2,576,423 | Stewart | Nov. 27, 1951 |
| 2,608,091 | Smith | Aug. 26, 1952 |
| 2,696,909 | Strand et al. | Dec. 14, 1954 |
| 2,716,887 | Smith | Sept. 6, 1955 |

OTHER REFERENCES

Book, Textbook on Sound, by J. W. Winstanley, p. 136, published by Longmans, Green & Co., Ltd., 1952.